(12) United States Patent
Papandreou

(10) Patent No.: US 6,360,632 B1
(45) Date of Patent: Mar. 26, 2002

(54) VEHICLE STEERING WHEEL

(75) Inventor: John P. Papandreou, Shelby Township, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/504,266

(22) Filed: Feb. 15, 2000

(51) Int. Cl.$^7$ ............................................... B62D 1/06
(52) U.S. Cl. ............................................ 74/558; 74/552
(58) Field of Search ..................... 74/552, 558, 558.5

(56) References Cited

U.S. PATENT DOCUMENTS

| 5,840,144 A | 11/1998 | Schumacher et al. | |
| 6,065,366 A | * 5/2000 | Koyama et al. | 74/552 |

FOREIGN PATENT DOCUMENTS

| JP | 54075 | * 3/1991 | 74/558 |
| JP | 404055164 | * 2/1992 | 74/558 |
| JP | 404163276 | * 6/1992 | 74/552 |
| JP | 404163277 | * 6/1992 | 74/558 |
| JP | 405105085 | * 4/1993 | 74/552 |
| JP | 10226338 | * 8/1998 | |
| JP | 10287246 | * 10/1998 | |

* cited by examiner

Primary Examiner—Mary Ann Green
(74) Attorney, Agent, or Firm—Tarolli, Sundheim, Covell, Tummino & Szabo L.L.P.

(57) ABSTRACT

A vehicle steering wheel (10) comprises a steering wheel armature (14) having adjoining first and second portions (20 and 60) and a decorative layer (30) covering the first portion (20) of the armature. The decorative layer (30) has an annular groove (44). A band (80) is disposed in the groove (44) in the decorative layer (30). A wrapable material (90) covers the second portion (60) of the armature (14). The wrapable material (90) includes an end portion (92) folded around the band (80) and disposed in the groove (44) to form a junction of the wrapable material and the decorative layer (30).

10 Claims, 2 Drawing Sheets

VEHICLE STEERING WHEEL

TECHNICAL FIELD

The present invention relates to a vehicle steering wheel. The invention is particularly directed to a vehicle steering wheel having a leather wrapping that adjoins wood trim on the steering wheel.

BACKGROUND OF THE INVENTION

It is common for the armature of a vehicle steering wheel to be wrapped in leather or a leather-like material. It is also common, particularly in luxury vehicles, to affix decorative wood trim to portions of the armature. Typically, the leather wrap adjoins the wood trim and a joint is formed where an end portion of the leather wrap meets an end portion of the wood trim. The joint is formed by tucking the end portion of the leather wrap into a thin, radially extending slit in the end portion of the wood trim.

The aforementioned joint can cause the manufacture of the steering wheel to be labor intensive. The manufacturing processes of cutting the wood trim, masking the steering wheel to stain and lacquer the wood trim, and subsequently removing the masking from the steering wheel can take significant amounts of time to complete when dealing with the thin slit in the wood trim. In addition, using the aforementioned joint, the leather wrap can have a tendency to come loose from the slit in the wood trim.

SUMMARY OF THE INVENTION

The present invention is a vehicle steering wheel comprising a steering wheel armature having adjoining first and second portions and a decorative layer covering the first portion of the armature. The decorative layer has an annular groove. A band is disposed in the groove in the decorative layer. A wrapable material covers the second portion of the armature. The wrapable material includes an end portion folded around the band and disposed in the groove to form a junction of the wrapable material and the decorative layer.

In accordance with a preferred embodiment of the invention, the decorative layer is made of wood and the wrapable material is leather.

The vehicle steering wheel further comprises a plastic layer covering the second portion of the armature and disposed underneath the wrapable material. A foam layer covers the plastic layer and is disposed underneath the wrapable material.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENTS

Figure 1:
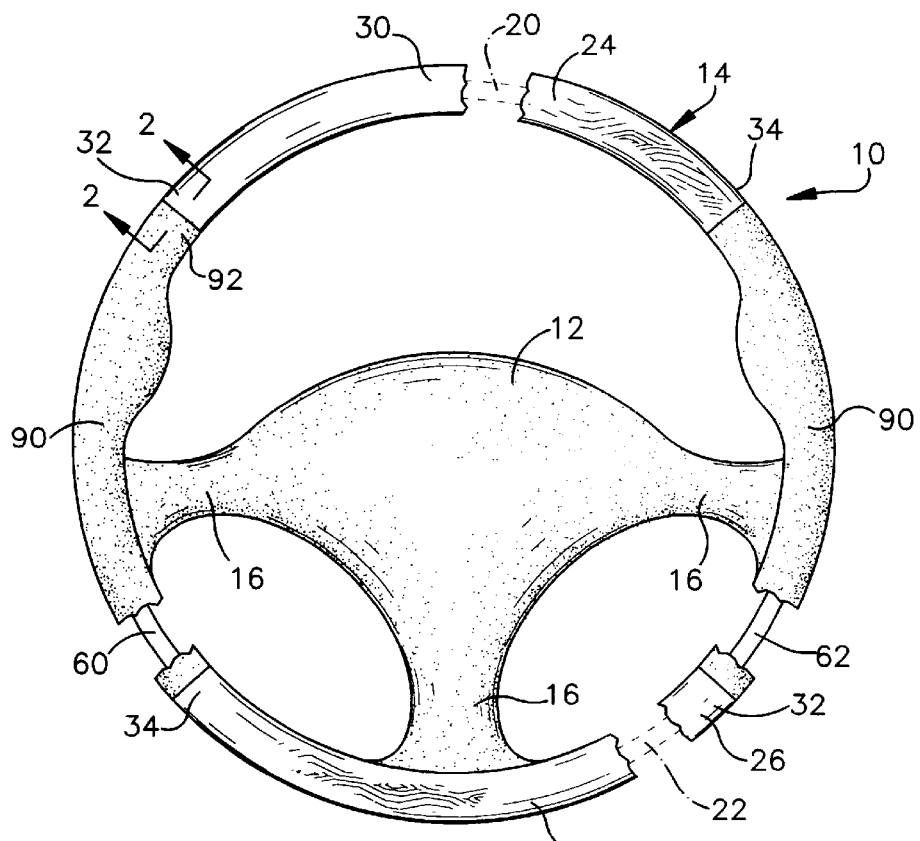
FIG. 1 is a schematic plan view of a vehicle steering wheel constructed in accordance with the present invention.

The present invention relates to a vehicle steering wheel. The invention is particularly directed to a vehicle steering wheel having a leather wrapping that adjoins wood trim on the steering wheel. As representative of the present invention, FIG. 1 illustrates a vehicle steering wheel 10.

The steering wheel 10 has a skeleton or armature that is preferably made of a metal material and includes a centrally located hub portion 12 and a ring-shaped rim portion 14. The rim portion 14 is connected to the hub portion 12 by a plurality of spokes 16. The hub portion 12 and the spokes 16 are covered by a plastic material, as is known in the art. Alternatively, the hub portion 12 and or the spokes 16 may be covered by another material, such as leather.

The rim portion 14 includes diametrically opposed first and second portions 20 and 22 covered by first and second segments 24 and 26, respectively, of a decorative layer 30. In accordance with a preferred embodiment of the invention, the decorative layer 30 is made of wood. Alternatively, the decorative layer 30 may be made of a simulated wood material, a plastic or rubber material, or other suitable synthetic material. The decorative layer 30 is attached to the first and second portions 20 and 22 of the rim portion 14 using an adhesive (not shown), as is known in the art.

Figure 2:
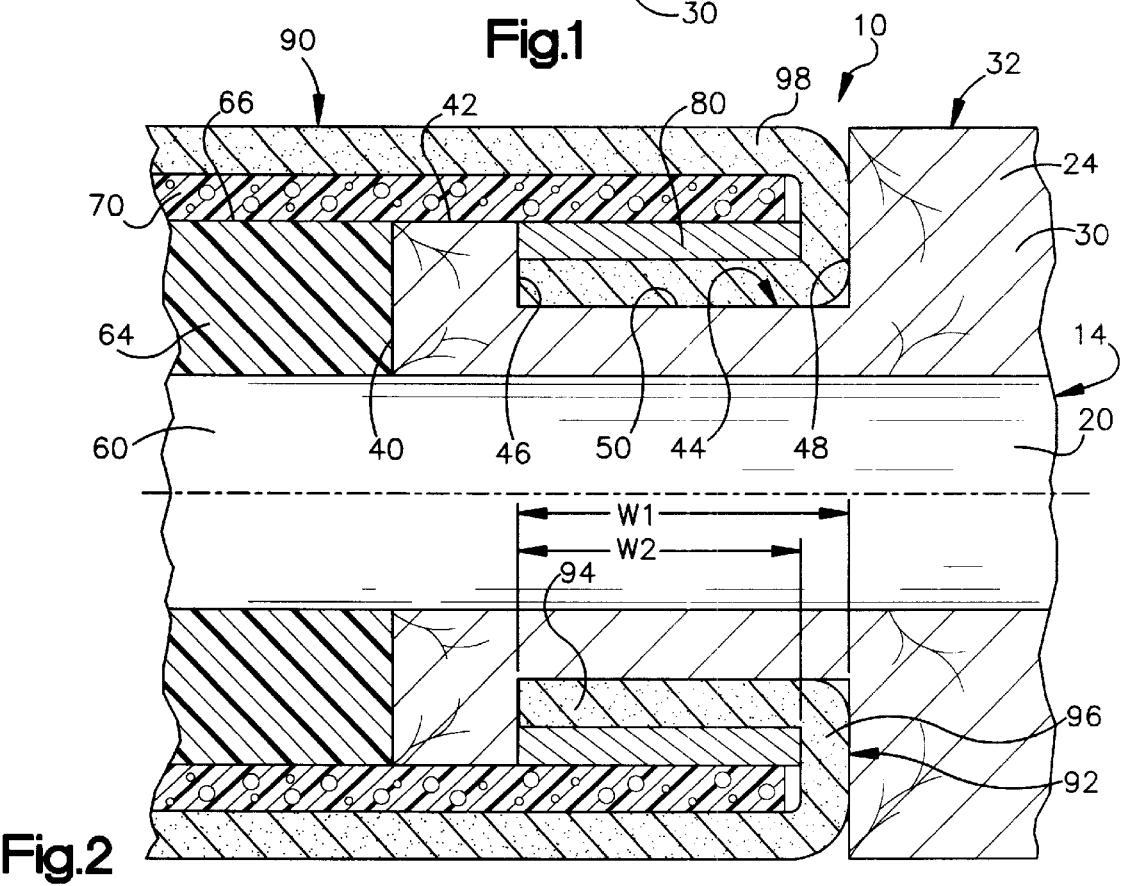
FIG. 2 is a sectional view taken along line 2—2 in FIG. 1.

Each of the first and second segments 24 and 26 of the decorative layer 30 has oppositely disposed end portions 32 and 34. All of the end portions 32, 34 are constructed similarly and therefore only one is shown and described in detail. Referring now to FIG. 2, the end portion 32 of the first segment 24 of the decorative layer 30 includes a radially extending first end surface 40, a second end surface 42, and an annular groove 44. The groove 44 is defined by radially extending first and second groove surfaces 46 and 48 connected by a third groove surface 50 that encircles the rim portion 14. The third groove surface 50 provides the groove 44 with a width W1. The second end surface 42 also encircles the rim portion 14 and extends between the first end surface 40 and the first groove surface 46.

The rim portion 14 further includes diametrically opposed third and fourth portions 60 and 62 (FIG. 1). The third and fourth portions 60 and 62 of the rim portion 14 extend between the first and second portions 20 and 22 of the rim portion. The third and fourth portions 60 and 62 are covered by a layer 64 (FIG. 2) of plastic material In accordance with the preferred embodiment of the invention, the layer 64 of plastic material is polyurethane, which is molded onto the rim portion 14. Alternatively, the layer 64 of plastic material could be made of another suitable polymer. As shown in FIG. 2, the layer 64 of plastic material covering each of the third and fourth portions 60 and 62 abuts the first end surface 40 of each end portion 32, 34 of the first and second segments 24 and 26 of the decorative layer 30. Further, the layer 64 of plastic material has an outer surface 66, which is flush with the second end surface 42 at each of the end portions 32 and 34 of the decorative layer 30.

The layer 64 of plastic material covering each of the third and fourth portions 62 and 64 of the rim portion 14 is encircled by a foam layer 70. The foam layer 70 overlies the outer surface 66 of the layer 64 of plastic material. The foam layer 66 also overlies the second end surface 42 at each of the end portions 32 and 34 of the decorative layer 30 and extends across a large portion of the width W1 of the groove 44 in the decorative layer.

A ring-shaped band 80 is disposed in the groove 44 in the decorative layer 30 underneath the foam layer 70. The band may be made from metal or a rigid plastic material. The band 80 has a width W2 which is slightly less than the width W1 of the groove.

The steering wheel 10 further includes a wrapable material 90 covering the third and fourth portions 60 and 62 of the rim portion 14. For each portion 60, 62 of the rim portion 14, the wrapable material 90 is an elongated strip of material that extends lengthwise along the portion 60, 62 of the rim portion 14. The strip of wrapable material is wrapped around the rim portion 14 so that elongated opposite edges 102 and 104 (FIGS. 3 and 4) of the strip abut one another. The wrapable material 90 encircles the foam layer 70, which is covering the plastic material 64 and the band 80. An adhesive (not shown) may be used to secure the wrapable material 90 to the foam layer 70. In accordance with the preferred embodiment of the present invention, the wrapable material 90 is leather. Alternatively, the wrapable material 90 could be a simulated leather or leather-like material, such as vinyl.

Figure 3:
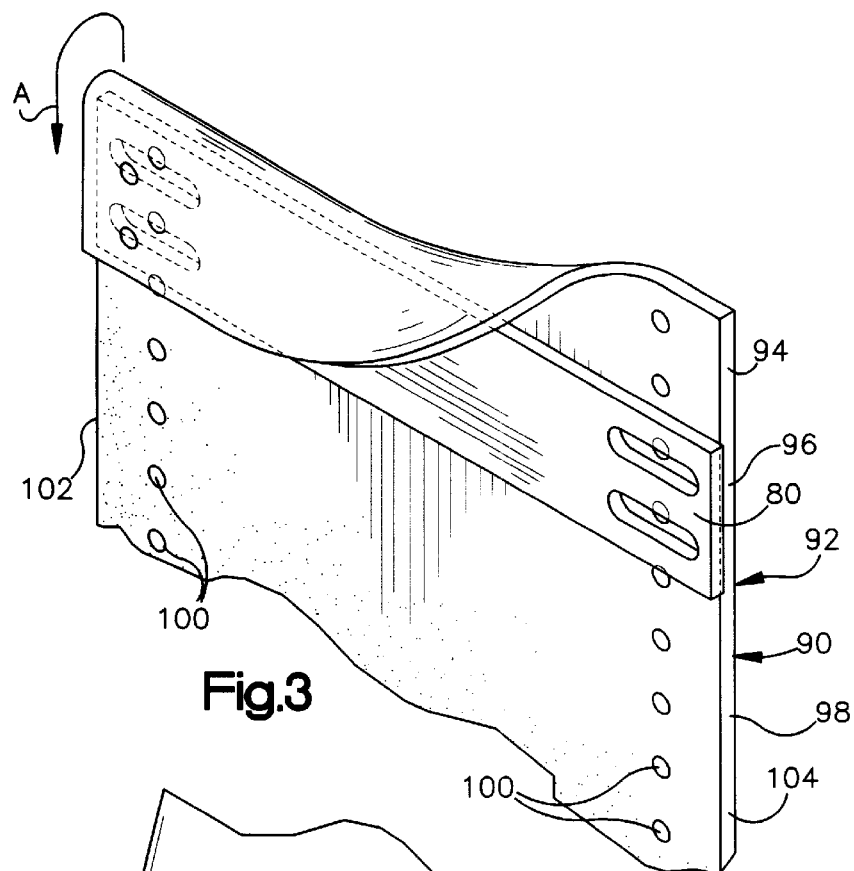
FIG. 3 is a rollout view of parts of the steering wheel of FIG. 1 during assembly of the steering wheel.

At each end of the third and fourth portions 60 and 62 of the rim portion 14, the wrapable material 90 includes an end portion 92. Each end portion 90 has a first section 94, a second section 96, and a third section 98. As best seen in FIG. 3 in which the foam layer 70 is omitted for clarity, the end portion 92 of the wrapable material 90 is positioned adjacent the band 80 during assembly of the steering wheel 10. The first and second sections 94 and 96 of the end portion 92 of the wrapable material 90 are then folded around the band 80 in the direction of arrow A. The end portion 92 of the wrapable material 90 and the band 80, which is inside the folded end portion 92, are then pressed into the groove 44 in the end portion 32 of the decorative layer 30 as shown in FIG. 2.

The first section 94 of the end portion 92 of the wrapable material 90 abuts the third groove surface 50 of the groove 44. The second section 96 of the end portion 92 of the wrapable material 90 is wedged, by virtue of the width W2 of the band 80 and thickness of the wrapable material, between the band and the second groove surface 48 of the groove 44. The second section 96 of the end portion 92 abuts the second groove surface 48 to provide a clean junction between the wrapable material 90 and the decorative layer 30. The third section 98 of the end portion 92 of the wrapable material 90 overlies the foam layer 70 and the band 80 and is the visible portion of the end portion 92 of the wrapable material.

Figure 4:
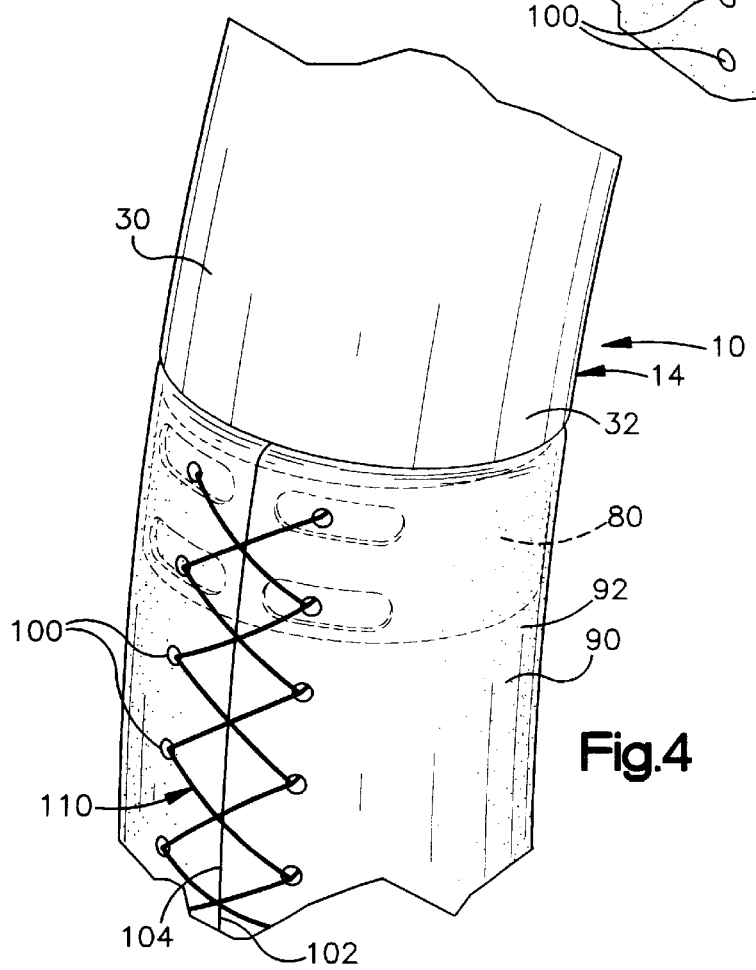
FIG. 4 is a perspective view of a portion of the steering wheel of FIG. 1.

As shown in FIGS. 3 and 4, the wrapable material 90 includes an array of perforations 100 along the opposite edges 102 and 104 of the wrapable material. When the wrapable material 90 is wrapped around the third and fourth portions 60 and 62 of the rim portion 14 and each respective end portion 92 of the wrapable material is inserted into a respective one of the grooves 44 in the decorative layer 30, the opposite edges 102 and 104 lie next to one another (FIG. 4). The edges 102 and 104 of the wrapable material 90 are then connected by stitches 110 that extend through the perforations 100.

The present invention provides a steering wheel 10 that has both a leather covering and wood trim and that is simpler to manufacture and assemble than previous steering wheels with leather covering and wood trim. The groove 44 in the decorative layer 30 is larger and easier to cut. The larger groove 44 also makes it easier to mask off the groove and non-wood trim portions of the steering wheel 10 so that the wood can be stained and lacquered. In addition, removal of the material used for masking is easier. Further, the present invention provides a joint between the wrapable material 90 and the decorative layer 30 that better secures the wrapable material and improves the finished appearance.

From the above description of the invention, those skilled in the art will perceive improvements, changes and modifications. For example, it should be apparent that the locations of the decorative layer and the wrapable material could be different from that which is disclosed above. Such improvements, changes and modifications within the skill of the art are intended to be covered by the appended claims.

Having described the invention, I claim:

1. A vehicle steering wheel comprising:
   a steering wheel armature having adjoining first and second portions;
   a decorative layer covering said first portion of said armature, said decorative layer having an annular groove;
   a band disposed in said groove in said decorative layer;
   a wrapable material covering said second portion of said armature, said wrapable material including an end portion folded around said band and disposed in said groove to form a junction of said wrapable material and said decorative layer; and
   a plastic layer covering said second portion of said armature and disposed underneath said wrapable material.

2. The vehicle steering wheel of claim 1 wherein said plastic layer has a radially extending end surface that abuts a radially extending end surface of said decorative layer.

3. The vehicle steering wheel of claim 1 further comprising a foam layer covering said plastic layer and disposed underneath said wrapable material.

4. The vehicle steering wheel of claim 3 wherein said foam layer extends into said groove in said decorative layer and adjoins said band inside said folded end portion of said wrapable material.

5. A vehicle steering wheel comprising:
   a steering wheel armature having adjoining first and second portions;
   a decorative layer covering said first portion of said armature, said decorative layer having an annular groove;
   a band disposed in said groove in said decorative layer, said band being made of metal; and
   a wrapable material covering said second portion of said armature, said wrapable material including an end portion folded around said band and disposed in said groove to form a junction of said wrapable material and said decorative layer.

6. A vehicle steering wheel comprising:
   a steering wheel armature having adjoining first and second portions;
   a decorative layer covering said first portion of said armature, said decorative layer having an annular groove;
   a wrapable material covering said second portion of said armature and including an end portion; and
   a band for securing said end portion of said wrapable material within said groove of said decorative layer;
   said end portion of said wrapable material being folded around said band and back under itself so as to overlie opposite sides of said band, a junction of said wrapable material and said decorative layer being formed when said band is disposed in said groove in said decorative layer.

7. The vehicle steering wheel of claim 6 wherein said decorative layer is made of one of the group consisting of wood and simulated wood material.

8. The vehicle steering wheel of claim 6 wherein said wrapable material is made of one of the group consisting of leather and simulated leather material.

9. The vehicle steering wheel of claim 6 wherein said band is made of metal.

10. The vehicle steering wheel of claim 6 wherein said wrapable material is further secured about said second portion of said armature by stitching.

* * * * *